United States Patent
Vetorino et al.

[11] Patent Number: 5,975,714
[45] Date of Patent: Nov. 2, 1999

[54] RENEWABLE ENERGY FLASHLIGHT

[75] Inventors: Steven Robert Vetorino, Fort Lupton; James Victor Platt, Arvada; Douglass Anderson Springer, Aurora, all of Colo.

[73] Assignee: Applied Innovative Technologies, Incorporated, Aurora, Colo.

[21] Appl. No.: 09/022,103

[22] Filed: Feb. 11, 1998

Related U.S. Application Data

[60] Provisional application No. 60/048,485, Jun. 3, 1997, and provisional application No. 60/048,502, Jun. 3, 1997.

[51] Int. Cl.$^6$ ............................................. F21L 9/00
[52] U.S. Cl. ................................. 362/192; 362/205
[58] Field of Search .................... 362/202, 205, 362/192, 193

[56] References Cited

U.S. PATENT DOCUMENTS

| | | | |
|---|---|---|---|
| 1,184,056 | 5/1916 | Van Derenter | 362/192 |
| 1,472,335 | 10/1923 | Luzy | 362/192 |
| 1,512,467 | 10/1924 | Johnson | 362/192 |
| 1,615,624 | 1/1927 | Häggi | 362/192 |
| 1,959,835 | 5/1934 | Meginniss | 362/202 X |
| 2,232,605 | 2/1941 | Holmes | 362/192 |
| 2,277,897 | 3/1942 | Alexander | 362/192 |
| 2,716,182 | 8/1955 | Carter | 362/205 X |
| 3,453,573 | 7/1969 | Kyle | 336/30 |
| 3,696,251 | 10/1972 | Last et al. | 290/53 |
| 3,924,117 | 12/1975 | Brindley | 362/205 X |
| 3,984,707 | 10/1976 | McClintock | 310/15 |
| 4,114,305 | 9/1978 | Wohlert et al. | 43/17.6 |
| 4,140,932 | 2/1979 | Wohlert | 310/15 |
| 4,360,860 | 11/1982 | Johnson et al. | 362/192 |
| 4,701,835 | 10/1987 | Campagnuolo | 362/192 |
| 4,709,176 | 11/1987 | Ridley et al. | 310/15 |
| 5,347,186 | 9/1994 | Konotchick | 310/17 |
| 5,552,973 | 9/1996 | Hsu | 362/192 |
| 5,584,561 | 12/1996 | Lahos | 362/72 |
| 5,839,817 | 11/1998 | Wei | 362/192 |

Primary Examiner—Laura K. Tso
Attorney, Agent, or Firm—Jennifer L. Bales; Macheledt Bales & Johnson LLP

[57] ABSTRACT

A renewable energy flashlight comprises a housing and a barrel located within the housing. The barrel has a wire coil wrapped around it, between the barrel and the housing. A magnet disposed within the barrel oscillates within the barrel when the barrel is shaken, generating an alternating current in the coil. Two springs at either end of the barrel cause the magnet to recoil when the magnet strikes the springs. An electronics assembly located within the housing includes a capacitor for storing charge, a rectifier connected to the capacitor, and means for conducting current flowing in the coil to the rectifier, to provide rectified current to the capacitor and charge the capacitor. A light emitting diode (LED) is connected to the capacitor by means of a switch, so the LED lights up when the switch is switched on.

21 Claims, 4 Drawing Sheets

FIG. 6c

RENEWABLE ENERGY FLASHLIGHT

This application claims the benefit of both U.S. Provisional Application No. 60/048,485, filed on Jun. 3, 1997, and U.S. Provisional Application No. 60/048,502, filed on Jun. 3, 1997.

BACKGROUND OF THE INVENTION

1. Field of the Invention

The present invention relates to a renewable energy flashlight.

2. Description of the Prior Art

Flashlights are extremely useful as portable lighting devices. However, several features of conventional flashlights limit their usefulness. Flashlights are commonly needed in emergencies, such as when the owner's car breaks down or the owner's electricity goes out. But there is no guarantee that when the emergency occurs, the flashlight will work. Currently, most flashlights use batteries, which rely on chemical reactions and therefore have limited useful life, as well as limited storage life. So, even if the flashlight was put in a drawer with fresh batteries, it may not work three years later when it is needed. Batteries can also cause corrosion due to leakage, rendering the flashlight unusable, even with fresh batteries. Further, most flashlights use incandescent lamps, which are prone to filament damage from shock, such as from being dropped. Incandescent lamps also burn out.

A second concern with conventional flashlights is how wasteful they are, both in the environmental sense and in a financial sense. Batteries are rapidly becoming a hazard to our environment due to their current methods of disposal. Also, they are expensive, and have to be replaced frequently.

A need remains in the art for a renewable energy flashlight that always works, even after being dropped or left in the car for years, without requiring batteries or incandescent lamps.

SUMMARY OF THE INVENTION

It is an object of the present invention to provide a renewable energy flashlight that always works, even after being dropped or left in the car for years, without requiring batteries or incandescent lamps.

The renewable energy flashlight of the present invention utilizes a magnet, which is oscillated through a coil of wire by shaking the flashlight, to generate electricity for charging a capacitor to power a light emitting diode.

The renewable energy flashlight comprises an elongated housing forming an opening at one end, a barrel assembly located within the housing which includes a hollow elongated barrel disposed within the housing, a wire coil wrapped around the barrel and disposed between the barrel and the housing, a magnet disposed within the barrel and sized to freely oscillate within the barrel when the barrel is shaken, two springs attached within the barrel and at either end of the barrel to cause the magnet to recoil when the magnet strikes the springs, wherein the magnet oscillates within the barrel when the barrel is shaken, whereby the magnet passes back and forth through the wire coil and causes current to flow within the coil. The flashlight also includes an electronics assembly located within the housing, including a capacitor for storing charge, a rectifier connected to the capacitor, means for conducting current flowing in the wire coil to the rectifier, which rectifies the current and provides rectified current to the capacitor, charging the capacitor, a light emitting diode (LED) located near the housing opening, and switch means for selectively connecting the charged capacitor to the LED, whereby the LED selectively lights up.

As a feature, the flashlight includes an LED protecting diode connected between the LED and the capacitor, for protecting the LED from high voltage surges. A resistor and a capacitor protecting diode connected between the LED and the capacitor, protect the capacitor from sustained overvoltage conditions. The LED protecting diode and the capacitor protecting diode are zener diodes.

The switch comprises a reed switch located within the housing, and a selectively movable magnet located external to the housing for activating the reed switch. Generally the charging magnet and the switch magnet are neodymium magnets. The wire coil is formed of magnet wire, and the housing and the barrel are formed of plastic. The springs are formed of stainless steel.

The flashlight also includes a lens affixed within the housing opening adjacent to the LED, for collecting and projecting light from the LED into a beam. The lens and the housing are hermetically sealed. This forms a hermetically sealed compartment containing the electronics assembly and the barrel assembly, making the flashlight explosion proof.

In general, the lens is located less than its focal distance away from the LED, whereby the light from the LED forms a slightly expanding beam.

DETAILED DESCRIPTION OF THE PREFERRED EMBODIMENT

Figures 1, 2:
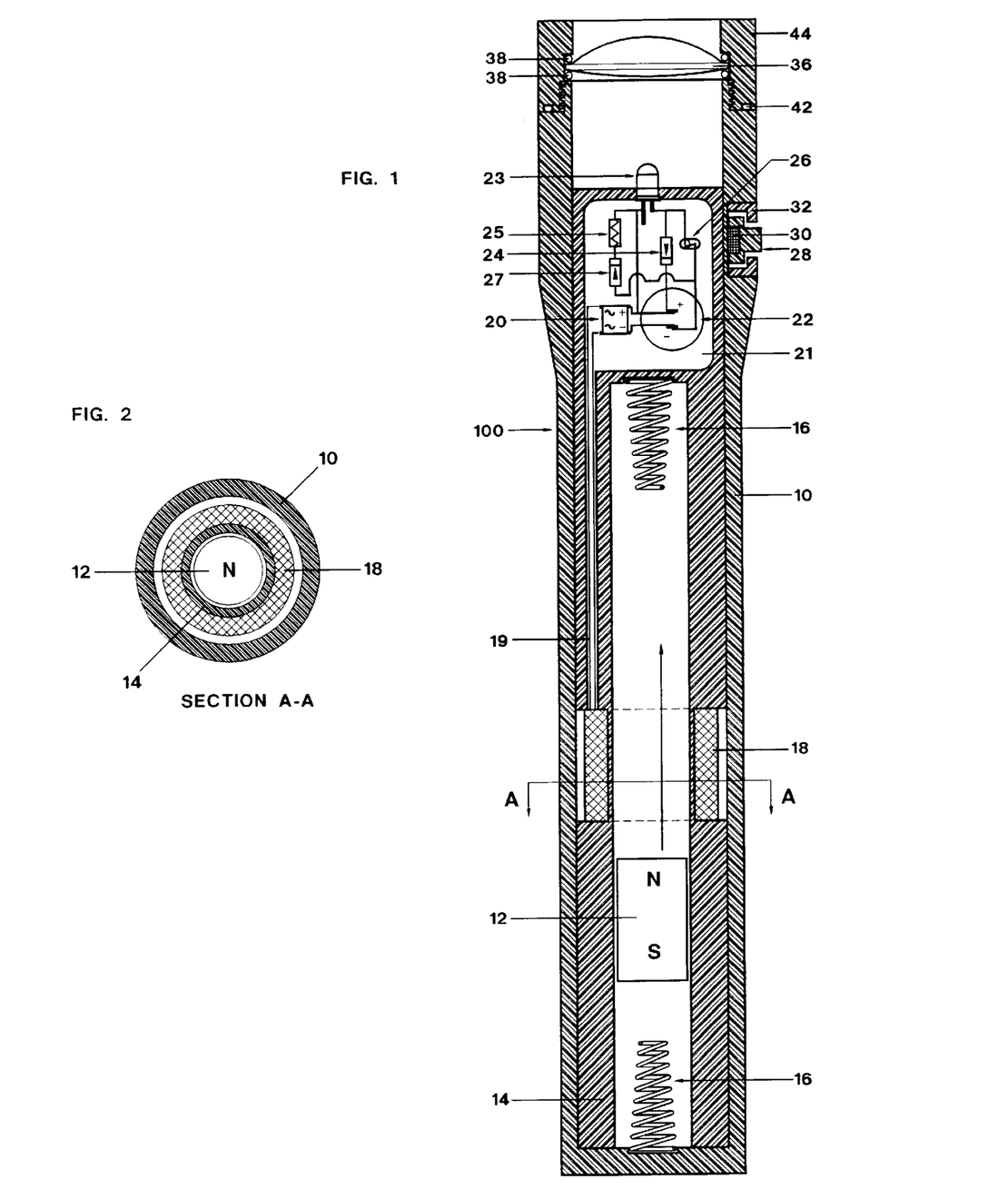
FIG. 1 is a cutaway side view depicting the preferred embodiment of the flashlight.
FIG. 2 is a cross section of the flashlight of FIG. 1, taken along section A—A.
Figure 4A:
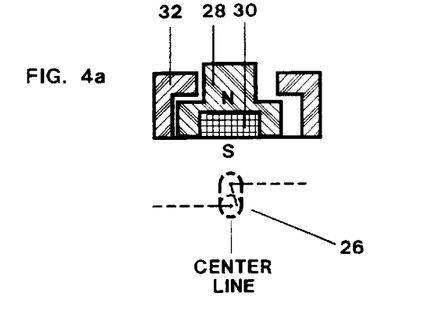
FIGS. 4a, 4b and 4c are detailed cutaway views showing the switch of the flashlight of FIG. 1.
Figure 4B:
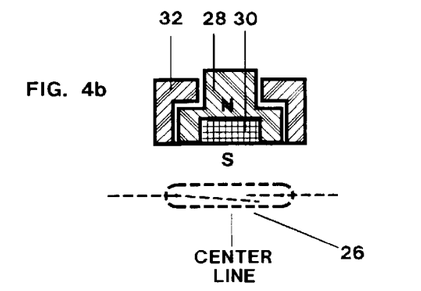
Figure 4C:
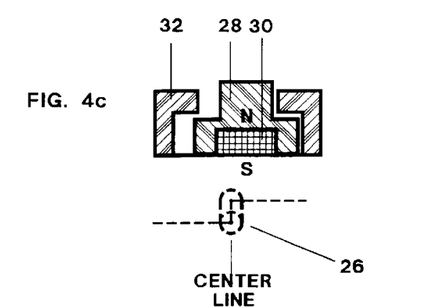

FIG. 1 is a cutaway side view depicting the preferred embodiment of flashlight 100. FIG. 2 shows a cross sectional view of flashlight 100, taken along A—A. Electricity is generated when flashlight 100 is shaken longitudinally, which causes charging magnet 12 to slide back and forth inside barrel 14, and thus through wire coil 18, which is wound around barrel 14. Magnet 12 bounces between springs 16, which conserve energy while changing the direction of magnet 12. As magnet 12 passes through wire coil 18, a sinusoidal voltage wave is created between two wires 19 exiting coil 18, as shown in FIG. 4a, thus generating an alternating current. Each sinusoidal wave is converted into a pair of positive going waves by bridge rectifier 20, as shown in FIG. 4b. These positive waves charge gold capacitor 22, which accumulates charge with each pass of magnet 12, as shown in FIGS. 4b and 4c. Charged gold capacitor 22 supplies energy to high intensity light emitting diode (LED) 23, coupled via a reed switch 26. LED protection zener diode 24 protects high intensity LED 23 from excessive voltage surges. Lens 36 collects light from high intensity LED 23 and focuses the light beam.

Housing 10 is sized to contain the mechanical, electrical, and optical components of flashlight 100. Housing 10 is preferably formed of plastic with an inside diameter of 1.270 inches and a wall thickness of 0.100 inches. It is nonmetallic to prevent eddy currents from forming in housing 10, which would slow charging magnet 12 during its travel through barrel 14. A means for sealing lens 36 and capping the end opposite lens 36 is provided to maintain a watertight and explosion proof seal (i.e. flashlight 100 can be used in an explosive environment, as it will not generate sparks which could ignite natural gas, for example).

Charging magnet 12 is preferably composed of three neodymium disc magnets stacked to form one magnet having poles on opposite ends of its cylindrical body. Neodymium magnets are preferred due to their high magnetic field strength. The individual magnets are 0.75 inches in diameter and 0.375 inches thick, and are stacked end to end to form one magnet array 1.125 inches long. The size of charging magnet 12 determines the current output and rate of charge. A larger charging magnet diameter can provide higher current. A longer charging magnet will provide longer current pulses. A length-to-diameter ratio of one and a half or more is recommended to maintain proper alignment in barrel 14.

Lens 36 is attached to housing 10 by lens retainer 44, which threads onto housing 10. Lens sealing o-rings 38 are formed of a pliable material such as silicone. Two lens sealing rings 38 are used, one on each side of lens 36. They provide a hermetic seal between housing 10 and lens 36, and cushion lens 36 from shock and stress. Lens retainer o-ring 42 provides a seal and protects threads between lens retainer 44 and housing 10. Note that a double hermetic seal is formed between housing 10 and lens retainer 44, both at the lens and at the joint between retainer 44 and housing 10, by use of the two lens sealing rings 38 and lens retainer o-ring 42. The internal o-ring 38 acts as a secondary seal behind o-ring 42 and external o-ring 38.

Lens 36 has a focal length of approximately one inch. The diameter of lens 36 is preferably about an inch and a half. Lens 36 should be sized and positioned so that nearly all of the light emitted light from LED 23 is collected by the lens. When lens 36 is located one focal length away from LED 23, the light emitted from LED is collimated. Moving the lens closer to LED 23 results in an expanding beam of light, which is the preferred position of the lens. Moving lens 36 farther away from LED 23 results in a converging beam of light. Lens 36 may be glass, but preferably is formed of an unbreakable optical material such as polycarbonate plastic. The curvature of lens 36 helps provide pressure resistance for underwater applications.

Figure 3:
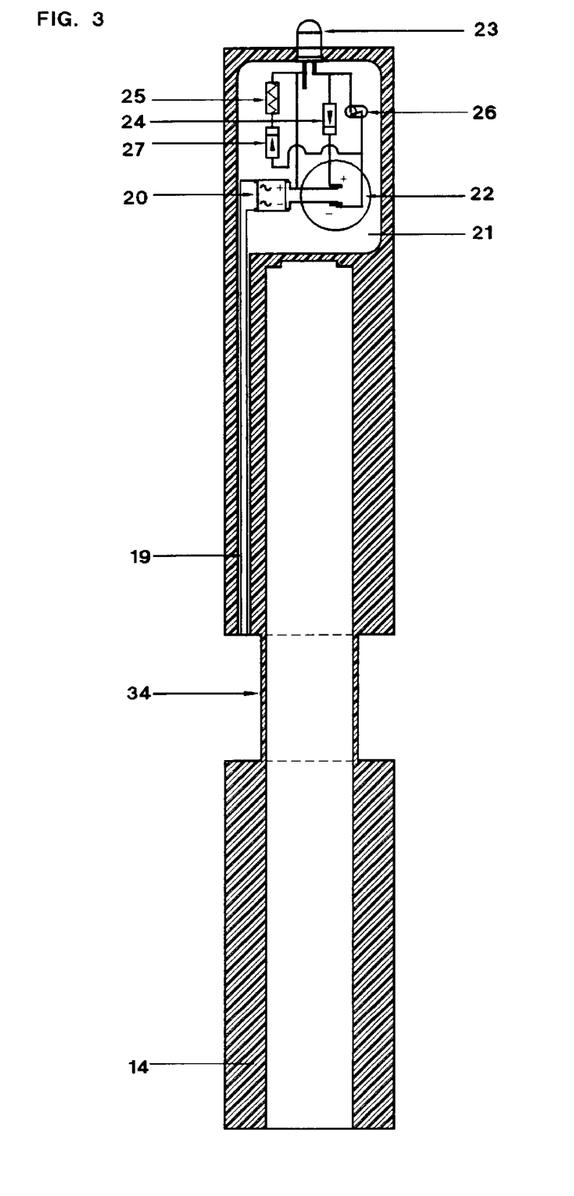
FIG. 3 is a cross sectional view of the barrel of the flashlight of FIGS. 1 and 2.

FIG. 3 shows barrel 14 and electronics assembly 21. Electronics assembly 21 may be disposed within barrel 14, as shown, or may be located within housing 10, beyond barrel 14. Barrel 14 is made from a hard nonmetallic substance such as plastic. It forms a spool 34 for winding wire coil 18, serves as a guide for magnet 12, and houses the electronic components. Spool 34 for winding wire coil 18 is created by reducing the outside diameter of barrel 14 midway along magnet 12's travel path. Barrel 14 has a longitudinal bore having a diameter slightly larger than that of magnet 12, to reduce air compression and reduce friction by minimizing wall contact with magnet 12. Clearance would preferably be around 0.020 inches. The length of the longitudinal bore in barrel 14 should be approximately five times the length of magnet 12 plus the length of two springs 16. This allows both polarities of the magnetic field to pass completely through wire coil 18, thus avoiding an overlapping condition of current waves during consecutive passes.

Springs 16 are preferably formed of stainless steel, and have enough resiliency to prevent "bottoming" of magnet 12. Stainless steel should be used because of its antimagnetic property. Springs 16 are not absolutely required for operation, but they do assist in conservation of energy by rebounding magnet 12.

Wire coil 18 is formed of insulated copper magnet wire. The preferred wire gauge is AWG #30. Wire coil 18 is optimized for the desired application by carefully selecting the wire gauge and coil geometry. Altering the wire gauge changes the voltage generated by the wire coil. As the wire is made smaller, more turns may occupy the same area, resulting in increased voltage with a reduction of current as a consequence.

With regard to the geometry of wire coil 18, the inside portion of wire coil 18 must be as close to magnet 12 as possible, meaning that the thickness of the barrel wall at spool 34 must be very thin, around 0.05 inches, to keep the coil in the highest magnetic density region of the passing magnetic field. The diameter of barrel 14 is about 0.88 inches. The outside portion of wire coil 18 is limited by the strength of magnet 12 and the bore of barrel 14, because magnetic field strength drops off rapidly as distance from the magnet increases. The length of coil 18 should be close to length of magnet 12. If coil 18 is shorter than magnet 12, there is a loss of efficiency, because the magnetic field is being cut by the coil less of the time. If coil 18 is longer than magnet 12, both magnetic fields will be cut by the coil at the same time, canceling the current during this time.

In the preferred embodiment, the dimensions of coil 18 are 1.125 inches long, 0.88 inches inside diameter, and 1.25 inches outside diameter. Such a coil will require approximately 2000 turns of AWG #30 magnet wire with an approximate length of 200 yards.

Figure 5:
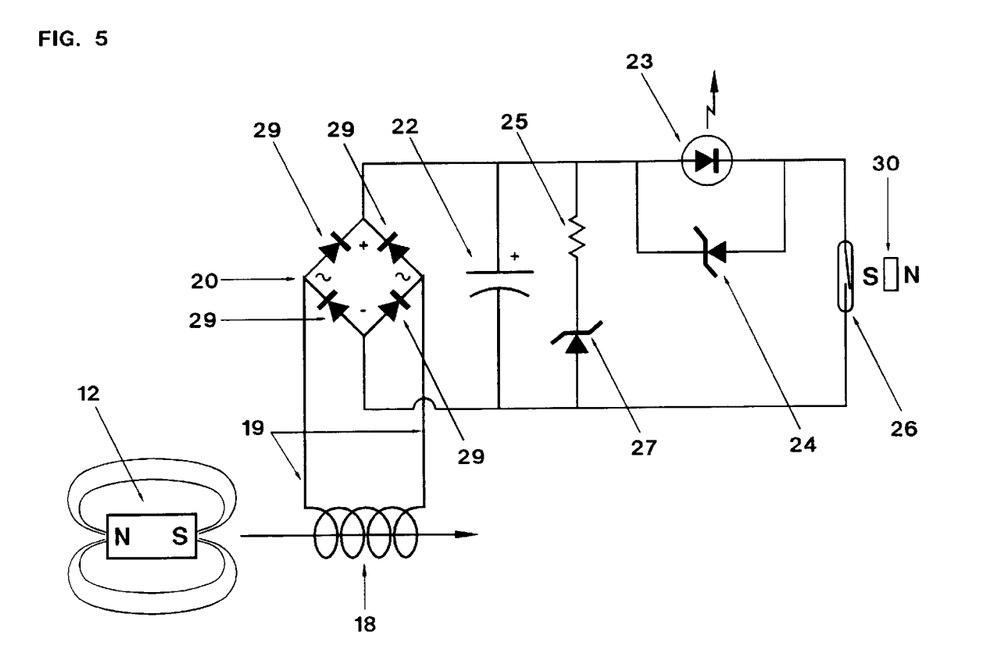
FIG. 5 is a schematic diagram showing the electrical circuit of the flashlight of FIG. 1.

FIG. 5 shows electronics assembly 21 in greater detail. Wires 19 connect wire coil 18 to bridge rectifier 20. Wires 19 may simply be the same wire used in coil 18, extended beyond the coil and terminated at bridge rectifier 20 during assembly.

Bridge rectifier 20 is a conventional bridge rectifier with four diodes 29. The AC inputs are connected to wires 19 from coil 18, and the DC outputs are connected to capacitor 22 in the standard configuration, rectifier positive to capacitor positive and rectifier negative to capacitor negative. Bridge rectifier 20 may be built using discrete diodes 29, or a conventional modular bridge rectifier may be used.

Gold capacitor 22 is preferably a microcomputer CMOS memory backup gold capacitor. In the preferred embodiment, capacitor 22 is 1.0 Farad with a rated voltage of 5.5 WVDC (working volts D.C.). If a larger capacitor is used, the time of shaking required to charge the capacitor is longer, and so is the amount of energy that can be stored.

LED protection zener diode 24 protects LED 23 from excessive forward voltage. The zener voltage is selected to not exceed the maximum forward voltage of LED 23. Capacitor protection zener diode 27 and current limiting resistor 25 protect capacitor 22 from overvoltage for extended periods of time. The zener voltage is selected to be slightly less than the maximum voltage rating of capacitor 22. The resistor is selected to bleed excess voltage from capacitor 22 while having minimal effect on charging pulses.

Reed switch 26 is single pole single throw with low resistance contacts made for low voltages at low currents. It is placed in series with the load to provide a means of connecting LED 23 to capacitor 22 to generate light. Reed switch 26 disconnects LED 23 from capacitor 22 when light is not required, conserving energy in capacitor 22. LED 26 should be disconnected from capacitor 22 during shaking in order to store energy in capacitor 22 more efficiently. LED 26 may be left connected to capacitor 22 during shaking, to provide a flashing effect.

Reed switch 26 is mounted in barrel 14 in a position very close to the inside wall of housing 10 when barrel 14 is installed. Barrel 14 must be properly oriented, by rotating it, within housing 10 to assure alignment of Reed switch 26 and actuating magnet 30. After proper alignment is obtained, barrel 14 is glued or otherwise secured into housing 10.

Reed switch 26 must be properly oriented, in order to prevent charging magnet 12 from affecting it. Reed switch 26 must be oriented with its long axis perpendicular to the axis of charging magnet 12. It is spaced apart from this axis, but centered with relation to it (put another way, reed switch 26 is parallel to a plane through the center of charging magnet 12).

FIGS. 4a, 4b, and 4c show the operation of reed switch 26 in detail. FIG. 4a shows reed switch 26 in the open position, and FIG. 4c shows reed switch 26 in the closed position. FIG. 4b shows the reed switch and magnet assembly as viewed from the end of flashlight 100. Switch activating magnet 30 is preferably a small neodymium magnet, 0.25 inches in diameter, ⅛ inch thick, with poles on opposite ends of its cylindrical shape. Switch activating magnet 30 is captivated by switch slide 28, which is retained by switch retainer 32. Switch activating magnet 30, switch slide 28 and switch retainer 32 are inserted into a pocket in housing 10 adjacent to reed switch 26. Reed switch 26 will be off when switch activating magnet 30 is directly over it. In this position it is effectively immune to the magnetic field of charging magnet 12. Reed switch 26 will turn on when switch activating magnet 30 is moved approximately 0.1 inch from the off position.

Alternatively, switch activating magnet 30 may also be placed so that in its first position, it is a sufficient distance away from reed switch 26 for reed switch 26 to be off, and in its second position, it is moved closer to reed switch 26 so that reed switch 26 turns on.

Figure 6A:
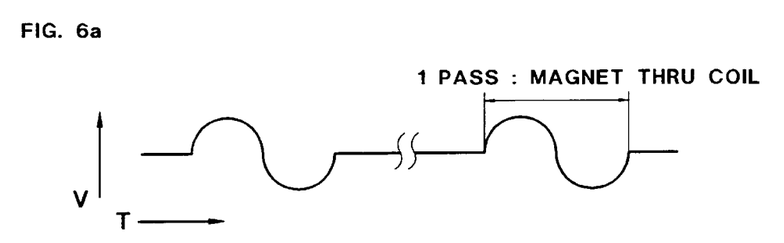
FIGS 6a, 6b and 6c are waveform diagrams showing voltage waveforms at specific points in the circuit of FIG. 5.

FIG. 6a shows a voltage waveform across wire coil 18. The waveform is sinusoidal, with gaps between the sine waves when the magnet is away from coil 18. The amplitude and frequency of the sine wave will vary depending upon the speed at which charging magnet 12 passes through coil 18.

Figure 6B:
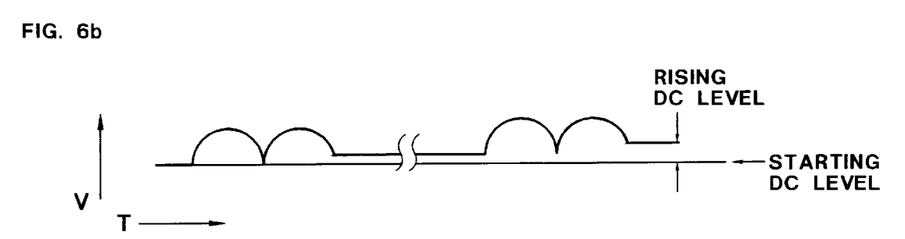

FIG. 6b shows the voltage across capacitor 22 (due to the rectified current provided by rectifier 20). The underlying voltage of capacitor 22 rises with time as flashlight 100 is shaken.

Figure 6C:
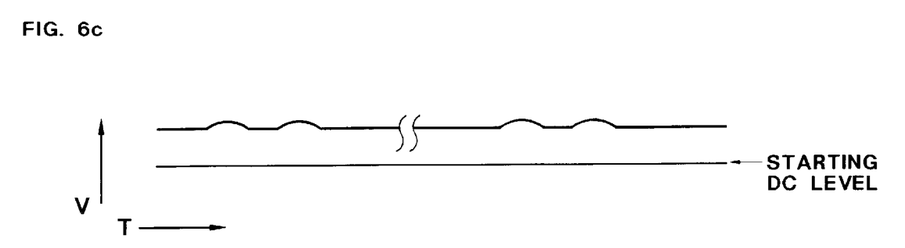

FIG. 6c shows the voltage across capacitor 22 after flashlight 100 has been shaken sufficiently to charge up capacitor 22. At this point, capacitor protection zener diode 27 and current limiting resistor 25 bleed voltage from capacitor 22, preventing overcharging of capacitor 22.

While the exemplary preferred embodiments of the present invention are described herein with particularity, those skilled in the art will appreciate various changes, additions, and applications other than those specifically mentioned, which are within the spirit of this invention.

What is claimed is:

1. A renewable energy flashlight comprising:
   an elongated housing forming an opening at one end;
   a barrel assembly located within the housing including:
   a hollow elongated barrel disposed within the housing,
   a wire coil wrapped around the barrel and disposed between the barrel and the housing,
   a charging magnet disposed within the barrel and sized to freely oscillate within the barrel when the barrel is shaken,
   two springs attached within the barrel and at either end of the barrel to cause the magnet to recoil when the magnet strikes the springs,
   wherein the charging magnet oscillates within the barrel when the barrel is shaken, whereby the charging magnet passes back and forth through the wire coil and causes current to flow within the coil; and
   an electronics assembly located within the housing, said electronics assembly including:
   a capacitor for storing charge,
   a rectifier connected to the capacitor;
   means for conducting current flowing in the wire coil to the rectifier, whereby the rectifier rectifies the current, said rectifier providing rectified current to the capacitor, whereby the capacitor is charged,
   a light emitting diode (LED) located near the housing opening, and
   switch means for selectively connecting the charged capacitor to the LED, whereby the LED selectively lights up.

2. The flashlight of claim 1, further including an LED protecting diode connected between the LED and the capacitor, for protecting the LED from high voltage surges.

3. The flashlight of claim 2, further including a resistor and a capacitor protecting diode connected between the LED and the capacitor, for protecting the capacitor from sustained overvoltage conditions.

4. The flashlight of claim 3, wherein the LED protecting diode and the capacitor protecting diode are zener diodes.

5. The flashlight of claim 1, wherein the switch comprises a reed switch located within the housing, and a selectively movable switch magnet located external to the housing for activating the reed switch.

6. The flashlight of claim 1, wherein the charging magnet is a neodymium magnet.

7. The flashlight of claim 6, wherein the coil is formed of magnet wire.

8. The flashlight of claim 7, wherein the housing and the barrel are formed of plastic.

9. The flashlight of claim 8 wherein the springs are formed of stainless steel.

10. The flashlight of claim 1, further including a lens affixed within the housing opening adjacent to the LED, for collecting and projecting LED light into a nearly collimated beam.

11. The flashlight of claim 10, further including means for hermetically sealing the housing and the lens.

12. The flashlight of claim 11, wherein the housing and the lens form a hermetically sealed compartment containing the electronics assembly and the barrel assembly, whereby the flashlight is explosion proof.

13. The flashlight of claim 10, wherein the lens is located less than its focal distance away from the LED, whereby the light from the LED forms a slightly expanding beam.

14. The flashlight of claim 10, further including an LED protecting diode connected across the LED, for protecting the LED from high voltage surges.

15. The flashlight of claim 14, further including a resistor and a capacitor protecting diode connected across the capacitor, for protecting the capacitor from sustained overvoltage conditions.

16. The flashlight of claim 15, wherein the LED protecting diode and the capacitor protecting diode are zener diodes.

17. The flashlight of claim 10, wherein the switch comprises a reed switch located within the housing, and a selectively movable switch magnet located external to the housing for activating the reed switch.

18. The flashlight of claim 10, wherein the charging magnet is a neodymium magnet.

19. The flashlight of claim 18, wherein the coil is formed of magnet wire.

20. The flashlight of claim 19, wherein the housing and the barrel are formed of plastic.

21. The flashlight of claim 20 wherein the springs are formed of stainless steel.

\* \* \* \* \*

(12) EX PARTE REEXAMINATION CERTIFICATE (5724th)
United States Patent
Vetorino et al.

(10) Number: US 5,975,714 C1
(45) Certificate Issued: Mar. 27, 2007

(54) RENEWABLE ENERGY FLASHLIGHT

(75) Inventors: Steven Robert Vetorino, Fort Lupton, CO (US); James Victor Platt, Arvada, CO (US); Douglass Anderson Springer, Aurora, CO (US)

(73) Assignee: Applied Innovative Technologies, Incorporated, Aurora, CO (US)

Reexamination Request:
No. 90/006,393, Sep. 27, 2002

Reexamination Certificate for:
Patent No.: 5,975,714
Issued: Nov. 2, 1999
Appl. No.: 09/022,103
Filed: Feb. 11, 1998

Related U.S. Application Data (60) Provisional application No. 60/048,485, filed on Jun. 3, 1997, and provisional application No. 60/048,502, filed on Jun. 3, 1997.

(51) Int. Cl.
    *F21L 9/00* (2006.01)

(52) U.S. Cl. .................. 362/192; 362/205; 310/15; 310/17

(58) Field of Classification Search .................. 362/192, 362/193, 202, 205; 310/12–15, 16, 25, 30
See application file for complete search history.

(56) References Cited

U.S. PATENT DOCUMENTS

| | | | |
|---|---|---|---|
| 3,100,292 A | 8/1963 | Warner | |
| 3,129,347 A | 4/1964 | Tognola | |
| 3,149,254 A | 9/1964 | Carter | |
| 3,453,573 A | 7/1969 | Kyle | |
| 3,696,251 A | 10/1972 | Last et al. | |
| 3,736,448 A | 5/1973 | Hebel, Jr. | |
| 3,933,535 A | 1/1976 | Becker | |
| 3,984,707 A | 10/1976 | McClintock | |
| 4,114,305 A | 9/1978 | Wohlert | |
| 4,140,932 A | 2/1979 | Wohlert | |
| 4,605,994 A | 8/1986 | Kreig | |
| 4,680,682 A | 7/1987 | Parker | |
| 4,709,176 A * | 11/1987 | Ridley et al. | 310/15 |
| 4,760,504 A * | 7/1988 | Schaller et al. | 362/205 |
| 4,777,582 A | 10/1988 | Sharrah | |
| 4,803,605 A | 2/1989 | Schaller et al. | |
| 4,870,550 A | 9/1989 | Uke | |
| 5,008,785 A | 4/1991 | Maglica et al. | |
| 5,347,186 A | 9/1994 | Konotchick | |
| 5,578,877 A | 11/1996 | Tiemann | |
| 5,818,132 A * | 10/1998 | Konotchick | 310/17 |

FOREIGN PATENT DOCUMENTS

| | | |
|---|---|---|
| JP | 5129781 | 3/1976 |
| JP | 55105902 | 8/1980 |
| JP | 58113202 | 8/1983 |
| JP | 9-82104 | 3/1997 |
| RU | 1830599 | 7/1993 |

* cited by examiner

*Primary Examiner*—John Anthony Ward (57) ABSTRACT

A renewable energy flashlight comprises a housing and a barrel located within the housing. The barrel has a wire coil wrapped around it, between the barrel and the housing. A magnet disposed within the barrel oscillates within the barrel when the barrel is shaken, generating an alternating current in the coil. Two springs at either end of the barrel cause the magnet to recoil when the magnet strikes the springs. An electronics assembly located within the housing includes a capacitor for storing charge, a rectifier connected to the capacitor, and means for conducting current flowing in the coil to the rectifier, to provide rectified current to the capacitor and charge the capacitor. A light emiting diode (LED) is connected to the capacitor by means of a switch, so the LED lights up when the switch is switched on.

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–21, dependent on an amended claim, are determined to be patentable.

New claims 22–34 are added and determined to be patentable.

1. A renewable energy flashlight comprising:
    an elongated housing forming an opening at one end *and sealed at the other end*;
    a barrel assembly located within the housing including:
        a hollow elongated barrel disposed within the housing,
        a wire coil wrapped around the barrel and disposed between the barrel and the housing,
        a charging magnet disposed within the barrel and sized to freely oscillate within the barrel when the barrel is shaken,
        two *elongated* springs attached within the barrel and at either end of the barrel to cause the magnet to recoil when the magnet strikes the springs, *wherein one spring has one end attached to the sealed end of the housing and extends into the barrel, and the other spring has one end attached to the barrel at the open end of the housing and extends into the barrel,*
        wherein the charging magnet oscillates within the barrel when the barrel is shaken, whereby the charging magnet passes back and forth through the wire coil and causes current to flow within the coil; and
    an electronics assembly located within the housing, said electronics assembly including:
        a capacitor for storing charge,
        a rectifier connected to the capacitor;
        means for conducting current flowing in the wire coil to the rectifier, whereby the rectifier rectifies the current, said rectifier providing rectified current to the capacitor, whereby the capacitor is charged,
        a light emitting diode (LED) located near the housing opening, and
        switch means for selectively connecting the charged capacitor to the LED, whereby the LED selectively lights up.

22. *A renewable energy flashlight comprising:*
    *a hollow elongated housing forming an opening at one end and sealed at the other end;*
    *a barrel assembly located within the housing including;*
        *an elongated barrel disposed within the housing;*
        *a wire coil wrapped around the barrel and disposed between the barrel and the housing;*
        *a charging magnet disposed within the barrel and sized to freely oscillate within the barrel when the barrel is shaken;*
        *an elongated spring at each end of the barrel and extending into the barrel, wherein one spring has one end attached to the sealed end of the housing, and the other spring has one end attached to the barrel at the open end of the housing;*
        *wherein the charging magnet oscillates within the barrel when the barrel is shaken, whereby the charging magnet passes back and forth through the wire coil and causes current to flow within the wire coil:*
    *an electronics assembly located within the housing, said electronics assembly including;*
        *a capacitor for storing charge;*
        *a rectifier connected to the capacitor;*
        *a electrical conductor connecting the wire coil to the rectifier and operable to allow the current generated in the wire coil to flow from wire coil to the rectifier, wherein the rectifier rectifies the current and provides the rectified current to the capacitor, causing the capacitor to be charged, and*
        *a light emitting diode (LED) located near the housing opening, and*
        *a switch operable to selectively connect the charged capacitor to the LED whereby when the capacitor is connected to the LED, the LED emits light.*

23. *The flashlight of claim 22, further including an LED protecting diode connected between the LED and the capacitor, for protecting the LED from high voltage surges.*

24. *The flashlight of claim 23, wherein the LED protecting diode is a zener diode.*

25. *The flashlight of claim 22, wherein the switch comprises a reed switch located within the housing, and a selectively movable switch magnet located external to the housing for activating the reed switch.*

26. *The flashlight of claim 22, wherein the charging magnet is a neodymium magnet.*

27. *The flashlight of claim 22, wherein the housing and the barrel are formed of plastic.*

28. *The flashlight of claim 22, wherein the compressive springs are formed of stainless steel.*

29. *The flashlight of claim 22, further comprising a lens affixed at the housing opening adjacent to the LED, and operable to allow light from the LED to pass.*

30. *The flashlight of claim 29, wherein the lens is operable to converge at least a portion of the light emitted from the LED.*

31. *The flashlight of claim 29, wherein the lens is operable to diverge at least a portion of the light emitted from the LED.*

32. *The flashlight of claim 29, wherein the lens is operable to collimate at least a portion of the light emitted from the LED.*

33. *The flashlight of claim 29, further including means for hermetically sealing the housing and the lens.*

34. *The flashlight of claim 33, wherein the housing and the lens form a hermetically sealed compartment containing the electronics assembly and the barrel assembly, whereby the flashlight is explosion proof.*

* * * * *